United States Patent [19]

Im et al.

[11] Patent Number: 4,540,623
[45] Date of Patent: Sep. 10, 1985

[54] COEXTRUDED MULTI-LAYERED ARTICLES

[75] Inventors: Jang-hi Im, Midland; William E. Shrum, St. Louis, both of Mich.

[73] Assignee: The Dow Chemical Company, Midland, Mich.

[21] Appl. No.: 696,231

[22] Filed: Jan. 29, 1985

Related U.S. Application Data

[63] Continuation of Ser. No. 542,292, Oct. 14, 1983, abandoned.

[51] Int. Cl.³ .................... B32B 27/08; B32B 27/36
[52] U.S. Cl. ................... 428/220; 264/46.1; 264/171; 428/213; 428/412
[58] Field of Search ............. 428/412, 36, 213, 220; 264/46.1, 171; 425/133.5

[56] References Cited

U.S. PATENT DOCUMENTS

| | | |
|---|---|---|
| 3,557,265 | 1/1971 | Chisholm et al. .............. 264/46.1 |
| 3,565,985 | 2/1971 | Schrenk et al. ................ 264/171 |
| 3,576,707 | 4/1971 | Schrenk et al. ................ 428/36 |
| 3,647,612 | 3/1972 | Schrenk et al. ................ 428/213 |
| 3,759,647 | 9/1973 | Schrenk et al. ................ 264/171 |
| 3,773,882 | 11/1973 | Schrenk ......................... 264/171 |
| 3,801,429 | 4/1974 | Schrenk et al. ................ 264/171 |
| 3,884,606 | 5/1975 | Schrenk ......................... 425/133.5 |
| 4,261,473 | 4/1981 | Yamada et al. ................. 428/412 X |

*Primary Examiner*—Thomas J. Herbert

[57] ABSTRACT

Laminated articles in the form of an extruded sheet have a multi-layered structure and comprise, on the average, alternating layers of coextruded polymeric thermoplastic materials, wherein one of said materials comprises a carbonate polymer. The articles exhibit good impact resistance even when scratched or notched, hydrolytic stability and transparency.

24 Claims, No Drawings

COEXTRUDED MULTI-LAYERED ARTICLES

CROSS-REFERENCE TO RELATED APPLICATION

This is a continuation of application Ser. No. 542,292, filed Oct. 14, 1983, now abandoned.

BACKGROUND OF THE INVENTION

This invention relates to multi-layered coextruded materials and, in particular, to composite multi-layered materials containing carbonate polymers.

It has become highly desirable to employ thermoplastic materials in extruded sheet applications, and in particular, transparent sheet applications. For example, carbonate polymers derived from reactions of dihydroxyorganic compounds, particularly the dihydric phenols and carbonic acid derivatives such as phosgene, have found extensive commercial application because of their excellent physical properties. These thermoplastic polymers appear to be particularly suitable for the manufacture of molded and extruded articles, wherein impact strength, rigidity, toughness, heat resistance, transparency and excellent electrical properties are required.

Unfortunately, however, such thermoplastic polymers are scratch and mar sensitive. This scratch and mar sensitivity introduces notches to the carbonate polymer materials and adversely affects the physical properties of the molded or extruded articles, such as impact resistance. It has been found desirable to blend less expensive thermoplastics with the carbonate polymer materials, and molding or extruding the resulting composition. However, properties such as impact strength and transparency are often deleteriously affected.

It is desirable to prepare thermoplastic sheets wherein a plurality of components are arranged in laminar fashion to provide the desired good physical characteristics. Unfortunately, the laminated layers are not generally prepared using coextrusion techniques, and the products comprise layers that are individually relatively thick, or the number of layers is relatively small.

In view of the deficiencies in the prior art, it would be highly desirable to produce an impact resistant, generally notch insensitive, multi-layer extruded article which can be employed in glazing and transparent sheet applications.

SUMMARY OF THE INVENTION

The present invention is an impact resistant laminated article in the form of an extruded sheet and having a multi-layered structure comprising, on the average, alternating layers of coextruded polymeric, thermoplastic materials wherein the number of layers is greater than or equal to about 40, and wherein one of said materials forming said alternating layers contains a carbonate polymer; and the alternating layers containing carbonate polymer are bound in an essentially contiguous relationship to adjacent layers of the other polymeric materials comprising said article, wherein said alternating layers are in the form of thin films, (i.e., laminar layers) each having a relatively sharply defined interface and are generally parallel to the major surface of said article; said article being comprised of from about 35 to about 90 percent by volume of said layers containing carbonate polymer.

The present invention is an improved multi-layered, highly impact resistance, generally notch insensitive, highly hydrolytically stable article comprising alternating layers of coextruded polymeric, resinous materials. The multi-layered articles exhibit increasing impact strengths as the thicknesses of the layers of resinous materials decrease for a sheet of a given total thickness. In addition, random scratches to the outermost layers of the article do not affect the impact resistance of said article to as great an extent as scratches of similar character on the surface of essentially pure, blended, or relatively thick-layered laminated thermoplastic materials.

The laminated articles of this invention allow the skilled artisan to prepare compositions which comprise lesser amounts of carbonate polymer and larger amounts of other thermoplastic polymer, and are suitably employed in most applications in which carbonate polymers and blends of carbonate polymer with various other thermoplastic polymers have previously been utilized. The articles of this invention can be transparent. Applications of particular interest for these carbonate polymer containing multi-layered articles are glazing application such as for windows and signs, profiles and moldings, housings for electrical appliances, radio and television cabinets, automotive equipment including ornaments and business machine housings, and the like. Other uses include security glazing applications, and applications as in the production of shields, transportation vehicles overglazing, solar energy units such as in greenhouses and skylight units, and the like.

DETAILED DESCRIPTION OF THE EMBODIMENTS

The carbonate polymers employed in the present invention are advantageously aromatic carbonate polymers such as trityl diol carbonates described in U.S. Pat. Nos. 3,036,036; 3,036,037; 3,036,038 and 3,036,039; carbonate polymers of bis(ar-hydroxyphenyl)alkylidenes (often called bisphenol-A type diols) including their aromatically and aliphatically substituted derivatives such as disclosed in U.S. Pat. Nos. 2,998,835; 3,028,365 and 3,334,154; and carbonate polymers derived from other aromatic diols such as described in U.S. Pat. No. 3,169,121.

It is understood, of course, that the carbonate polymer may be derived from two or more different dihydric phenols, a copolymer of a dihydric phenol with a glycol, with a hydroxy or acid terminated polyester or with a dibasic acid in the event a carbonate copolymer or interpolymer rather than a homopolymer is desired. Also suitable for the practice of this invention are blends of any of the above carbonate polymers. Also included in the term "carbonate polymer" are the ester carbonate copolymers of the types described in U.S. Pat. Nos. 3,169,121; 4,330,662 and 4,105,633. Of the aforementioned carbonate polymers, the carbonate polymers of bisphenol-A are preferred. Methods for preparing carbonate polymers for use in the practice of this invention are well known, for example, several suitable methods are disclosed in the aforementioned patents which are hereby incorporated by reference in their entirety.

The multi-layered articles of this invention comprise alternating layers containing the aforementioned carbonate polymers and alternating layers which can comprise a wide variety of other thermoplastic materials. For example, it is desirable to employ those rubber-modified monovinylidene aromatic polymers as are described in U.S. Pat. No. 4,243,764 which is incorporated herein by reference. Also especially preferred are the transparent rubber-containing resins of the type disclosed in U.S. Pat. No. 3,880,783 which is also incorporated herein by reference. Of the rubber-modified resins, the rubber-modified styrene/acrylonitrile resins, for example, styrene/acrylonitrile/butadiene resins, are most preferred. Also desirable are the styrene/butadiene resins and the acrylonitrile/methacrylate/butadiene resins.

Suitable thermoplastic resins which can be employed in addition to the aforementioned carbonate polymers include copolymers of monovinylidene aromatic monomers and ethylenically unsaturated monomers. Representative monomers are of the type disclosed in the aforementioned U.S. Pat. No. 4,243,764. Especially preferred copolymers include styrene/acrylonitrile, styrene/acrylic acid, styrene/α-methylstyrene/acrylic acid, and styrene/maleic anhydride.

Suitable thermoplastic resins can also include, for example, the polyolefins such as polyethylene, polypropylene and olefinic copolymers and blends. Also suitable are resins such as polymethyl methacrylate, polystyrene, polyvinyl chloride and polyvinylidene chloride.

As used herein, the term "lamination" or "laminated article" refers to two or more layers of different thermoplastic materials which are brought together under high pressure and/or temperature conditions and/or in the presence of adhesives in order to obtain adherence of the different layers to one another. Also, as used herein, the term "coextrusion" or "extruded sheets" refers to two or more different thermoplastic materials which are brought together from various extrusion means and are placed in contact with one another prior to their exit through an extrusion die to form a laminated article.

The thickness of the extruded sheet can vary. For purposes of this invention, the term "sheet" is used as defined in ASTM D-883 (i.e., a form of plastic in which the thickness is very small in proportion to length and width and in which the plastic is present as a continuous phase throughout, with or without filler). The thickness of the extruded sheets of this invention can vary depending upon the application which is desired. The thickness of extruded sheets typically vary from about 10 mils (i.e., about 0.25 mm) to about 1 inch (i.e., about 2.5 cm), preferably from about 30 mils (i.e., about 0.76 mm) to about 0.5 inch (i.e., about 1.3 cm), and most preferably from about 40 mils (i.e., about 1 mm) to about 0.25 inch (i.e., about 0.7 cm).

In the preparation of the carbonate polymer containing blend, a minor amount of at least one of the aforementioned other polymeric components are combined with a major amount of a carbonate polymer using conventional mixing techniques such as admixing granular or particulate polymeric components, and subsequent melt blending of the components. Alternatively, the blends can be prepared by heat plastifying the higher melting polymeric components, (i.e., the carbonate polymer and the copolymer) and then adding other desired components thereto either in granular or heat plastified form. Generally, the order of mixing the blend components is not particularly critical. It is understood that in another aspect of this invention the layer containing carbonate polymer can contain essentially carbonate polymer or a blend of carbonate polymers and another thermoplastic polymer.

A condition for transparency of carbonate polymer containing blends such as those as are used in this invention is a substantial equality of the refractive indices of the polymer constituents. In order to obtain highly transparent blends, the copolymer additives most advantageously have a refractive index which differs by not more than about 0.01, preferably less than about 0.002 unit from that of carbonate polymer. A compound is defined as transparent for the purposes of this invention if a layer 50 mils in thickness exhibits a luminous transmittance (according to ASTM D-1003-61) of at least about 70 percent. A transmittance of greater than 80 percent is preferred. For glazing purposes, a transmittance of above about 85 is most preferred. In addition to high transmittance, it is also desirable for the blend to exhibit a low haze (i.e., exhibit high clarity). For glass-like clarity, a haze of about 5 percent or less (according to ASTM D-1003-61) is most desirable. For most glazing purposes, a haze of less than about 10 percent is preferred. As used herein, "transparent carbonate polymer compositions" means such a composition that exhibits a high luminous transmittance as well as a low haze.

In accordance with one aspect of the invention, in addition to the transparency of the other thermoplastic material, said material must be compatible with the carbonate polymer. That is, the carbonate polymer containing blend must, for the most part, exhibit the good physical properties which are exhibited by essentially pure carbonate polymer.

Especially preferred thermoplastic materials employed in preparing carbonate polymer containing transparent blends include those prepared from the polymerization of styrene and acrylonitrile such that said styrene/acrylonitrile (SAN) copolymer contains an amount of acrylonitrile (AN) such that said copolymer has a refractive index which very nearly matches that of the carbonate polymer, preferably within about 0.002 unit of that of carbonate polymer. For example, a preferred SAN copolymer of this aspect of the present invention comprises about 92 to about 95 weight percent styrene, preferably about 94.2 to about 94.6 percent styrene, most preferably about 94.4 percent styrene, and about 5 to about 8 percent acrylonitrile, preferably about 5.4 to about 5.8 percent acrylonitrile, most preferably 5.6. The SAN containing about 5 to about 8 weight percent content of AN has a refractive index of about 1.584 to about 1.586. This preferred additive exhibits a refractive index which very nearly equals that of commercially available carbonate polymer, which exhibits a refractive index of about 1.586.

Preferred transparent carbonate polymer/SAN blends contain from about 75 to less than about 100 weight percent of carbonate polymer. Such blends, when properly extruded, can maintain Rheometrics Dart impact strengths of at least 50 percent that of essentially pure carbonate polymer. The carbonate polymer/SAN blends provide laminar layers which exhibit improved flow properties, as might be expected, but they also exhibit impact resistances which are unusually high in view of the impact resistances of the blend components. In the most preferred embodiments (i.e., compositions comprising extruded layers of blends containing greater than about 80, most preferably greater than about 90 weight percent carbonate polymer) impact resistances of the blends are very nearly equal to that impact resistance exhibited by the carbonate polymer component.

Other preferred copolymers employed in preparing transparent carbonate polymer containing blends include those prepared from the polymerization of styrene and acrylic acid such that said styrene/acrylic acid (SAA) copolymer contains an amount of acrylic acid (AA) such that said copolymer has a refractive index which very nearly matches that of the carbonate polymer, preferably within about 0.002 unit of that of carbonate polymer. For example, a SAA of the present invention comprises about 1 to about 8 weight percent of AA, preferably about 7 to about 8 weight percent AA; and about 92 to less than about 100 weight percent styrene. Such a copolymer has a refractive index which nearly equals that of a commercially available carbonate polymer.

Carbonate polymer/SAA blends maintain good impact resistant properties (i.e., greater than about 50 percent of that of essentially pure carbonate polymer) in the range from about 84 to about 99 weight percent of carbonate polymer when properly extruded. The polycarbonate/SAA blends provide laminar layers which exhibit improved flow properties, as might be expected, but they also exhibit impact resistances which are unusually high in view of the impact resistances of the blend components. In the most preferred embodiments (i.e., compositions comprising extruded layers of blends containing greater than about 88 weight percent polycarbonate) impact resistances of the blends are very nearly equal to that impact resistance exhibited by the carbonate polymer component.

The number of layers comprising the multi-layered article can vary. Advantageously, the number of layers can range from about 40 to about 1500, although such numbers depend on the capability of the coextrusion devices which are employed. It is most desirable to prepare multi-layered sheets having a large number of layers. For example, sheets having a large number of layers can be prepared by stacking and molding the sheets of laminated materials through compression, heat and/or use of adhesives. In such instances, the number of layers comprising the multi-layered article is essentially unlimited.

The volume fraction of the resins comprising the multi-layered sheet can vary, depending upon factors such as ease of processability or desired impact resistance of the sheet. The volume fractions of the resins comprising the multi-layered sheets can also be dependent upon the type of thermoplastic resins employed. Most desirably, the amount of the layers containing carbonate polymer can range from about 35 to about 90, preferably from about 40 to about 80, percent based on the total volume of the sheet. Conversely, the amount of the layers containing the other thermoplastic(s) can range from about 10 to about 65, preferably from about 20 to about 60, percent based on the total volume of the sheet. It is understood that the aforementioned volume fractions do not include the sacrificial skins and integral skins, as are defined hereinafter.

Multi-layered articles of this invention are most advantageously prepared by employing a multi-layered coextrusion device as described in U.S. Pat. Nos. 3,773,882 and 3,884,606 which are incorporated herein by reference. Such a device provides a method for preparing multi-layered, simultaneously extruded thermoplastic materials, each of which are of substantially uniform layer thicknesses. Preferably, a series of layer multiplying means as is described in U.S. Pat. No. 3,759,647 which is incorporated herein by reference is employed.

The "feedblock" of the coextrusion device receives streams of diverse thermoplastic resinous materials from a source such as a heat plastifying extruder. The streams of resinous materials are passed to a mechanical manipulating section within the feedblock which serves to rearrange the original streams into a multi-layered stream having the number of layers desired in the final article. If desired, however, this multi-layered stream is subsequently passed through a series of layer multiplying means, in order to further increase the number of layers comprising the final article. The multi-layered stream is then passed into an extrusion die which is so constructed and arranged that streamlined flow is maintained therein. Such an extrusion die is described in U.S. Pat. No. 3,557,265 which is incorporated herein by reference. The resultant product is extruded and is a multi-layered article wherein each layer is generally parallel to the major surface thereof.

The configuration of the extrusion die can vary and can be such as to reduce the thicknesses and dimensions of each of the layers in the desired region of the extruded sheet. It is preferable that the thickness of the layers in the extrusion die be in the range from about 0.05 $\mu$m to about 1,000 $\mu$m. The precise degree of reduction in thickness of the layers delivered from the mechanical orienting section, the configuration of the die, and the amount of mechanical working of the sheet after extrusion are all factors which affect the thickness of the individual layers in the product.

It is most desirable that the carbonate polymer containing material comprises the outermost layers of the extruded sheet. However, for certain applications, it is desirable that the other thermoplastic resin comprises the outermost layers of the extruded sheet. It is also most desirable that the extruded sheet comprises alternating layers containing carbonate polymer and one thermoplastic resin, such that on the average, carbonate polymer containing layers will be present every other layer within the multi-layered sheet. It is also most desirable that the layers, for example, containing carbonate polymer be bound in an essentially contiguous relationship to the adjacent layers rather than dispersed or mixed within the other polymeric material(s). That is, it is highly desirable that the layers each exhibit a relatively sharply defined interface. Especially near the surface of the sheet, it is desirable that there not be any mixing of layers. It is also possible to employ, for example, the carbonate polymer containing blend plus two other thermoplastic resins, such that on the average, carbonate polymer containing layer will be present every third layer within the multi-layered article. It is also possible to employ an adhesive material as a "layer" between each of the carbonate polymer containing layers and other thermoplastic resin layers.

The use of the term "on the average" is employed to account for the fact that the outermost layers of the multi-layered stream can become adjacent layers as said multi-layered stream is successively passed through the layer multiplying means.

Sacrificial skins can also be employed in order to increase the ease of processing the multi-layered articles of this invention and to protect surfaces from damage prior to use. Said skins can advantageously comprise polyolefins such as polypropylene and, preferably, polyethylene. Said skins are most advantageously about 1 mil to about 10 mils thick. The sacrificial skins are applied to the extruded article by introducing to the main flow a stream of skin material at a position between the layer multiplying means and the extrusion die. It is possible to apply the skin melt in either of two ways. For example, the skin melt can be added to the top and bottom of the main flow, or the skin melt can encapsulated the main flow throughout the entire perimeter. After the sacrificial skin material is applied to the sheet, it becomes a part of the multi-layered sheet until it is peeled off.

It is also desirable to employ an integral skin material of dimensions similar to the sacrificial skin. Most preferably, the integral skin contains carbonate polymer. It is desirable to incorporate, for example, an ultra-violet stabilizer into the integral skin material. The integral skin is applied in much the same manner as is the sacrificial skin. In addition, the integral skin can be applied to the multi-layered stream after exiting the feedblock and prior to the passing of said stream through the layer multiplying means. This allows one to introduce a relatively thick layer of carbonate polymer or other thermoplastic material within the multi-layered article. It is also desirable to add an outermost integral skin after the extruded article has exited the layer multiplying means.

The laminated articles of this invention exhibit good physical properties. Impact properties of the multi-layered materials approach that of essentially pure carbonate polymer. Hydrolytic stability of the multi-layered materials is superior to that of essentially pure carbonate polymer materials. The impact resistance of the sheets of this invention both at ambient temperature and at very low temperatures is also quite high. In addition, the articles of this invention are less sensitive to random surface scratches than are essentially pure carbonate polymer materials. In addition, the optical properties of the articles of this invention are comparable to those of essentially pure carbonate polymer when transparent thermoplastic resins are employed. The good optical properties are observed even if the adjacent layers comprising the various transparent thermoplastic materials possess refractive indices which are different from one another. It is understood that the refractive indices of the thermoplastic materials comprising the adjacent layers can be essentially equal to one another.

In addition to the carbonate polymer and other thermoplastic resin components, it is also desirable to incorporate other additives into the article through said polymeric components. In this regard, such additives as stabilizers, lubricants, plasticizers, anti-oxidants, fire retardants, fillers, reinforcing fibers, pigments and the like can be employed in preparing the extruded sheets.

The following examples are intended to illustrate the invention and are not intended to limit the scope thereof.

EXAMPLE 1

Employing an apparatus generally described in FIG. 3 of each of U.S. Pat. Nos. 3,773,882 and 3,759,647, a sheet is prepared having 194 layers and a final thickness of about 50 mils. The transparent thermoplastic resins are a polycarbonate of bisphenol-A (designated PC) which is commercially available under the trade name Merlon M-40 by Mobay Chemical; and a styrene/acrylonitrile resin (designated as SAN) having a 70/30 percent S/AN which is commercially available as TYRIL ® 867 B from The Dow Chemical Company. The number of layers of polycarbonate is 98 and the number of layers of styrene/acrylonitrile is 96 (i.e., the polycarbonate is the outermost layer and the original multi-layered stream has been doubled by a layer multiplying means). The amount of each of the thermoplastic resins is varied to yield sheets comprising various volume fractions of each of said resins. The sheet is extruded and has a sacrificial skin of polyethylene about 3 mils thick on each side of said sheet. For comparison purposes, extruded sheets of essentially pure polycarbonate and essentially pure styrene/acrylonitrile are prepared. Rheometrics Impact measurements are performed on each sheet at room temperature (i.e. 20° C.) and at −40° C. Sacrificial skins are removed prior to Rheometrics Impact measurements. The sheets are all about 50 mils in thickness. The results are presented in Table I.

TABLE I

| Sample | Description (Volume %) PC/SAN | Rheometrics Impact Strength (inch-lbs)[1] | |
|---|---|---|---|
| | | 20° C. | −40° C. |
| C-1* | 0/100 | 0.4 | 0.1 |
| C-2* | 30/70 | 10 | 17 |
| 1 | 45/55 | 121 | 101 |
| 2 | 67/33 | 190 | 182 |
| C-3* | 100/0 | 240 | 203 |

*Not an example of the invention.
[1]Based on a sample normalized to 50 mils in thickness.

The data in Table I indicates that good impact strength is observed both at ambient temperatures and low tempertures for those samples which comprise relatively large amounts of styrene/acrylonitrile resin.

EXAMPLE 2

Using techniques described in Example 1, a 776-layered sheet is prepared comprising 392 layers of the previously described polycarbonate and 384 layers of the previously described styrene/acrylonitrile resin (i.e., the polycarbonate is the outermost layer and the original multi-layered stream has been rearranged by 3 successive layer multiplying means). Various samples having thickness of about 50 mils are prepared, as in Example 1, and Rheometrics Impact measurements are performed on each sheet at room temperature. The results are presented in Table II.

TABLE II

| Sample | Description (Volume Percent PC/SAN) | Rheometrics Impact Strength (inch-lbs)[1] |
|---|---|---|
| C-1* | 0/100 | 0.4 |
| 3 | 37/63 | 115 |
| 4 | 50/50 | 150 |
| 5 | 65/35 | 203 |
| C-3* | 100/0 | 240 |

*Not an example of the invention.
[1]Based on a sample normalized to 50 mils in thickness.

The data in Table II indicates that the multi-layered samples containing the styrene/acrylonitrile resin exhibit good impact strengths.

EXAMPLE 3

The hydrolytic stability of various polycarbonate and styrene/acrylonitrile resin multi-layered sheets is compared to that of polycarbonate. Multi-layered sheets are prepared as described in Examples 1 and 2. A stress is applied to each sheet as the samples are immersed in a water bath at 80° C. Times to break each of the samples at the essentially constant stress are measured and the results are presented in Table III.

TABLE III

| Sample | Description (Vol. % PC/SAN) | No. Layers | Applied Stress (psi) | Time to Break (minutes) |
| --- | --- | --- | --- | --- |
| 6 | 60/40 | 194 | 2,260 | 22,400 |
| 7 | 68/32 | 776 | 2,440 | 25,100 |
| C-3* | 100/0 | — | 2,340 | 1,590 |

*Not an example of the invention.

The data in Table III indicates that the multi-layered samples exhibit greatly improved properties under comparable stress. This indicates the hydrolytic stability of the multi-layered samples is much improved over that of essentially pure polycarbonate.

EXAMPLE 4

Using techniques described in Example 1, a 392-layered sheet is prepared about 35 mils thick comprising 200 layers of the previously described polycarbonate and 192 layers of polymethylmethacrylate (designated as PMMA) which is sold commercially under the trade name Plexiglas V-052 by Rohm and Haas. The polycarbonate is the outermost layer and the original multi-layered stream has been rearranged by 3 successive layer multiplying means. Rheometrics Impact measurements are performed on said sheet at room temperature. The results are presented in Table IV.

TABLE IV

| Sample | Description (Volume Percent PC/PMMA) | Rheometrics Impact Strength (inch-lbs)[1] |
| --- | --- | --- |
| C-4* | 0/100 | 0.1 |
| 8 | 60/40 | 102 |
| C-5* | 100/0 | 169 |

*Not an example of the invention.
[1]Based on a sample normalized to 35 mils in thickness.

The data in Table IV indicates the multi-layered sample comprising polymethymethacrylate exhibits good impact strength.

EXAMPLE 5

Using techniques described in Example 1, a 392-layered sheet about 50 mils thick is prepared comprising 200 layers of the previously described polycarbonate and 192 layers of styrene/acrylonitrile. The sample is designated as Sample No. 9. The polycarbonate is the outermost layer and the original multi-layered stream has been rearranged by 3 successive layer multiplying means. Optical measurements, such as yellowness index (Y.I), light transmission (Trans.) and haze, are performed on said sheet. The results are presented in Table V.

TABLE V

| Sample | Description (Vol. % PC/SAN) | Y.I.[1] | Trans.[2] | Haze[2] |
| --- | --- | --- | --- | --- |
| 9 | 60/40 | 2.0 | 89 | 1.5 |
| C-3* | 100/0 | 1.7 | 91 | 2.0 |

*Not an example of the invention.
[1]Measured per ASTM D-1925.
[2]Measured per ASTM D-1003.

The data in Table V indicates that the optical properties of the multi-layered sample are comparable to the polycarbonate sample of the same thickness.

EXAMPLE 6

Using techniques described in Example 1, a 49-layered sheet is prepared comprising 25 layers of the previously described polycarbonate and 24 layers of the previously described styrene/acrylonitrile resin (i.e., the polycarbonate is the outermost layer). The sample is designated Sample No. 10. Similarly, a 97-layered sheet is prepared comprising 49 layers of the previously described polycarbonate and 48 layers of the previously described styrene/acrylonitrile resin (i.e., the polycarbonate is the outermost layer). The sample is designated as Sample No. 11.

Surface cracks are introduced to the 50 mil thick sheets in random directions using a sharp razor blade. Cracks are 0.25 inch wide and 8 mils deep. Rheometrics Impact tests are performed by hitting the sheet at the center of each crack but from directly behind the crack (i.e., from the side of the sheet opposite that of the crack). Results are presented in Table VI.

TABLE VI

| Sample | (Volume %) PC/Resin | Rheometrics Impact Strength[1] (inch-lbs.) Cracked Sample | Uncracked Sample |
| --- | --- | --- | --- |
| 10 | 72/28 | 131 | 140 |
| 11 | 35/65 | 65 | 100 |
| C-3* | 100/0 | 53 | 240 |

*Not an example of the invention.
[1]Based on a sample normalized to 50 mils in thickness.

The data in Table VI indicates that the multi-layered samples exhibit good impact strengths even when subjected to random surface cracks. It is noted that a polycarbonate sample exhibits greatly reduced impact strength when subjected to random surface cracks.

EXAMPLE 7

Integral skins of carbonate polymer are introduced to a multi-layered article comprising the previously described polycarbonate and the previously described styrene/acrylonitrile resin. A 776-layered sheet is prepared comprising 392 layers of polycarbonate and 384 layers of styrene/acrylonitrile as described in Example 2. Polycarbonate integral skins are applied as are the polyethylene sacrificial skins. The total thickness of the sheet is 62 mils. Results are presented in Table VII.

TABLE VII

| Sample | Description (Vol. % PC/SAN) | Individual Skin Thickness | Rheometrics Impact Strength (Inch-lbs.) |
| --- | --- | --- | --- |
| 12 | 72/28 | 4 mils | 277 |

What is claimed is:

1. An impact resistant laminated article in the form of an extruded sheet having a thickness of greater than 10 mils and having a multi-layered structure comprising, on the average, alternating layers of coextruded polymeric, thermoplastic materials wherein the number of layers is greater than or equal to about 40, and wherein one of said materials forming said alternating layers contains a carbonate polymer; and the alternating layers containing carbonate polymer are bound in an essentially contiguous relationship to adjacent layers of the other polymeric materials comprising said article, wherein said alternating layers are in the form of thin films each having a relatively sharply defined interface and are generally parallel to the major surface of said article; said article being comprised of from about 35 to about 90 percent by volume of said layers containing carbonate polymer.

2. A laminated article of claim 1 wherein the thickness of said sheet is from greater than 0.25 mm to about 2.5 cm.

3. A laminated article of claim 1 wherein the number of said alternating layers ranges from about 40 to about 1500.

4. A laminated article of claim 1 wherein said article is transparent.

5. A laminated article of claim 1 wherein the thickness of said sheet is from about 0.76 mm to about 1.3 cm.

6. A laminated article of claim 1 wherein said article has applied to the major surfaces thereof, a polyolefinic sacrificial skin.

7. A laminated article of claim 1 wherein the outermost layers of said multi-layered structure comprise a carbonate polymer.

8. A laminated article of claim 1 wherein said carbonate polymer is a homopolymer of bisphenol-A.

9. A laminated article of claim 1 wherein said layers containing carbonate polymer comprise a major amount of a carbonate polymer and a minor amount of at least one of another thermoplastic material.

10. A laminate article of claim 1 where additives selected from the group consisting of stabilizers, lubricants, plasticizers, anti-oxidants, fire retardants, fillers, reinforcing fibers and pigments are incorporated into said article through said thermoplastic materials.

11. A laminated article of claim 1 wherein said layers containing a carbonate polymer consist essentially of carbonate polymer.

12. A laminated article of claim 1 wherein said article is comprised of from about 40 to about 80 percent by volume of layers containing carbonate polymer.

13. A laminated article of claim 1 having a thickness of greater than 10 mils and having a suitable thickness for application in glazing applications.

14. A laminated article of claim 1 wherein the multi-layered structure comprises, on the average, alternating layers of two coextruded polymeric, thermoplastic materials wherein one of said polymeric materials is a carbonate polymer.

15. A laminated article of claim 14 wherein one of said polymeric, thermoplastic materials is a styrene/acrylonitrile copolymer.

16. A laminated article of claim 14 wherein one of said polymeric, thermoplastic materials is a styrene/acrylic acid copolymer.

17. A laminated article of claim 14 wherein one of said polymeric, thermoplastic materials is polymethylmethacrylate.

18. A laminated article of claim 14 wherein one of said polymeric, thermoplastic materials is a rubber-modified styrene/acrylonitrile copolymer.

19. A laminated article of claim 1 wherein said article has applied therein and to the major surfaces thereof, an integral skin.

20. A laminated article of claim 19 wherein an ultraviolet stabilizer is incorporated into said integral skin.

21. A laminated article of claim 1 wherein said layers containing carbonate polymer comprise a major amount of a carbonate polymer and a minor amount of at least one other polymeric thermoplastic material.

22. A laminated article of claim 21 wherein said other thermoplastic material is a copolymer of styrene/acrylonitrile or styrene/acrylic acid.

23. A laminated article of claim 21 wherein the refractive indices of said polymeric, thermoplastic materials are essentially equal to that of said carbonate polymer.

24. A laminated article of claim 21 wherein said article is transparent.

* * * * *